United States Patent [19]

Cowan et al.

[11] Patent Number: 5,515,921
[45] Date of Patent: May 14, 1996

[54] WATER-BASE MUD CONVERSION FOR HIGH TEMPRATICE CEMENTING

[75] Inventors: Kenneth M. Cowan, Sugar Land; Arthur H. Hale; James J. W. Nahm, both of Houston, all of Tex.

[73] Assignee: Shell Oil Company, Houston, Tex.

[21] Appl. No.: 372,791

[22] Filed: Dec. 23, 1994

Related U.S. Application Data

[63] Continuation of Ser. No. 226,746, Apr. 12, 1994, abandoned, which is a continuation of Ser. No. 886,546, May 20, 1992, abandoned, which is a continuation-in-part of Ser. No. 751,399, Aug. 28, 1991, abandoned, and Ser. No. 691,903, Apr. 26, 1991, abandoned, said Ser. No. 751,399, is a division of Ser. No. 671,627, Mar. 19, 1991, Pat. No. 5,058,679, which is a continuation-in-part of Ser. No. 641,794, Jan. 16, 1991, abandoned, which is a continuation-in-part of Ser. No. 457,429, Dec. 27, 1989, abandoned.

[51] Int. Cl.$^6$ .................................................. E21B 33/14
[52] U.S. Cl. ........................... 166/293; 106/790; 166/292; 175/65
[58] Field of Search ............................ 166/66, 250, 285, 166/292, 293, 300; 175/61, 64, 65; 106/790

[56] References Cited

U.S. PATENT DOCUMENTS

| | | |
|---|---|---|
| 2,621,132 | 12/1952 | Saal . |
| 2,649,160 | 8/1953 | Williams et al. . |
| 2,705,050 | 3/1955 | Davis et al. . |
| 2,822,873 | 2/1958 | Harmsen et al. . |
| 3,022,824 | 2/1962 | Binkley et al. . |
| 3,071,481 | 1/1963 | Beach et al. . |
| 3,168,139 | 2/1965 | Kennedy et al. . |
| 3,499,491 | 3/1970 | Wyant et al. ............... 166/292 |
| 3,557,876 | 1/1971 | Tragesser ............... 166/292 |
| 3,605,898 | 9/1971 | Harrison et al. ............... 166/293 |
| 3,615,785 | 10/1971 | Moorer et al. . |
| 3,887,009 | 6/1975 | Miller et al. ............... 166/292 |
| 3,920,466 | 11/1975 | Danjushevsky et al. ............... 166/292 |
| 3,921,717 | 11/1975 | Danjushevsky et al. . . |
| 3,936,408 | 2/1976 | Adams et al. . . |
| 3,964,921 | 6/1976 | Persinski et al. ............... 166/293 X |
| 3,990,903 | 11/1976 | Mallow ............... 166/292 X |
| 4,011,909 | 3/1977 | Adams et al. ............... 166/293 |
| 4,040,854 | 8/1977 | Persinski et al. . . |
| 4,053,323 | 10/1977 | Adams et al. . . |
| 4,095,987 | 6/1978 | Walker ............... 166/293 X |
| 4,114,692 | 9/1978 | Gallus ............... 166/293 |
| 4,176,720 | 12/1979 | Wilson ............... 166/293 |
| 4,200,153 | 4/1980 | Gallus ............... 166/292 |
| 4,252,193 | 2/1981 | Powers et al. ............... 166/292 |
| 4,299,516 | 11/1981 | Miyoshi et al. ............... 405/266 |
| 4,374,738 | 2/1983 | Kelley ............... 524/445 |
| 4,519,452 | 5/1985 | Tsao et al. ............... 166/288 |
| 4,584,327 | 4/1986 | Sutton ............... 166/292 X |
| 4,674,572 | 6/1987 | Gallus ............... 166/285 |
| 4,676,832 | 6/1987 | Childs et al. ............... 166/293 X |
| 4,775,009 | 10/1988 | Wittrisch et al. ............... 166/250 |
| 4,780,220 | 10/1988 | Peterson ............... 252/8.551 |
| 4,802,998 | 2/1989 | Mueller et al. . . |
| 4,883,125 | 11/1989 | Wilson et al. ............... 166/291 |
| 4,953,620 | 9/1990 | Bloys et al. . . |
| 4,997,487 | 3/1991 | Vinson et al. . . |
| 5,004,506 | 4/1991 | Allen et al. . . |
| 5,005,646 | 4/1991 | Bloys et al. ............... 166/293 |
| 5,016,711 | 5/1991 | Cowan ............... 166/250 |
| 5,035,813 | 7/1991 | Shen ............... 252/8.551 |
| 5,058,679 | 10/1991 | Hale et al. ............... 166/293 |

*Primary Examiner*—George A. Suchfield

[57] ABSTRACT

The thermal stability of hardened drilling mud-concrete is improved by incorporating blast furnace slag, microfine slag or fine ground glass into the mud-concrete prior to hardening.

3 Claims, No Drawings

WATER-BASE MUD CONVERSION FOR HIGH TEMPRATICE CEMENTING

RELATED APPLICATIONS

This is a continuation application of prior application Ser. No. 226,746 filed on Apr. 12, 1994, abandoned, which is a continuation of Ser. No. 886,546 filed May 20, 1992, abandoned, which is a continuation-in-part of Ser. No. 751,399 filed Aug. 28, 1991, abandoned, and a continuation-in-part of Ser. No. 691,903, filed Apr. 26, 1991, abandoned. Application Ser. No. 751,399 is a division of Ser. No. 671,627 filed Mar, 19, 1991, now U.S. Pat. No. 5,058,679, which is a continuation-in-part of application Ser. No. 641,794 filed Jan. 16, 1991, abandoned, which is a continuation-in-part of application Ser. No. 457,429 filed Dec. 27, 1989, abandoned.

BACKGROUND OF THE INVENTION

1. Field of the Invention

The present invention pertains to improvements in drilling mud-cement compositions for cementing oil and gas wells. The compositions are characterized by improved setting at low temperatures and resistance to strength retrogression at temperatures above 230°–250° F.

2. Description of Prior Art

The general procedure of drilling an oil or gas well includes drilling a borehole using a drilling mud. Subsequent to drilling the borehole, casing is run into the well preparatory to placing a cement slurry in the annulus between the outside of the casing and the borehole wall. Wells with temperatures above 230°–250° F. present special cementing problems. For example, converted drilling fluid compositions known as C-Mix suggested by R. E. Wyant's U.S. Pat. No. 3,499,491 are particularly temperature sensitive. In other words, if wellbore temperatures exceed 230°–250° F., the cement compositions (C-Mix) or any converted drilling fluids suggested by Wilson in U.S. Pat. Nos. 4,883,125 and 4,176,720 have a tendency to undergo thermal strength retrogression. Since the C-Mix composition contains a substantial mount of Portland cement, the set C-Mix has a tendency to undergo strength retrogression at temperatures above approximately 230°–250° F.

Thermal strength retrogression is a particular problem in cementing any deep, hot wells or wells associated with thermal recovery processes. For example, the Belridge field in California has two major producing zones, the Tulare Sands and the Diatomitc/Brown Shale. The Tulare zone has been extensively steam flooded for several years such that temperatures in producing intervals range from 250° F. to 400° F. The Diatomitc/Brown Shale formation lies beneath the Tulare Sands and extends from 700 feet to 4,000 feet. Since C-Mix undergoes severe strength retrogression at temperatures 230°–250° F. it cannot be used in cementing wells in this field.

Wells with low bottom hole temperatures also present special cementing problems. For example, wells in the North Hobbs field, New Mexico, have low bottom hole temperatures, e.g., approximately 100° F. at a depth of 4,000 feet. In addition, these wells are normally drilled with 10.5 lb/gal salt saturated muds. A low temperature, salt tolerant mud-cement formulation is needed to cement these wells. Another example for low temperature wells are those deep-water wells in the Gulf of Mexico. Mud-lime temperatures range between 40° F. and 60° F. Surface casing cements for these wells must be activated at low temperatures.

Accordingly, the present invention is directed to overcoming the above-noted problems in the art and provides a solution as more particularly described hereinafter.

SUMMARY OF THE INVENTION

It is the primary purpose of the present invention to provide drilling mud-cement compositions which, after setting up in an oil or gas well, are suitable for cementing wells with a wide temperature range; e.g., 40°–600° F.

The purpose of this invention is achieved through a method for cementing a well with a mud-cement functional to harden and set up in-situ, said mud-cement being resistant to thermal strength retrogression, comprising preparing a mud-cement by admixing (a) a drilling mud, (b) a material selected from the group consisting of blast furnace slag, particulate glass, and mixtures thereof, and (c) a C-Mix comprising cement and pozzolanic material, or by admixing (i) a drilling mud, (ii) a material selected from the group consisting of blast furnace slag, particulate glass, and mixtures thereof, and (d) activator(s) functional to cause the mud-cement to set up; displacing the mud-cement to a preselected location in the well; and allowing the mud-cement to harden and set up.

This invention also includes a mud-cement composition for cementing a well, said composition being settable at low temperatures and yet resistant to thermal strength retrogression, comprising an admixture of (a) a drilling mud, (b) a material selected from the group consisting of blast furnace slag, particulate glass, and mixtures thereof, and (c) a C-Mix comprising cement and pozzolanic material, or by admixing (i) a drilling mud, (ii) a material selected from the group consisting of blast furnace slag, particulate glass and mixtures thereof, and (d) activator(s) functional to cause the mud-cement to set up.

HTC-Mix which is a high temperature version of C-Mix, is prepared by adding either or a combination of about 10 to 60 wt % blast furnace slag (basis HTC-Mix) or about 10 to 60 wt % powdered glass (basis HTC-Mix) to the C-Mix. A new class of formulation designated as S-Mix is prepared by adding about 100 wt % blast furnace slag (basis S-Mix) to a water-base mud and one or more alkaline or other activating agents. S-Mix is designed to use for cementing wells with wide temperatures ranging from approximately 40° F. to 600° F.

Other purposes, distinctions over the art, advantages and features of the invention will be apparent to one skilled in the art upon review the following.

DESCRIPTION OF PREFERRED EMBODIMENTS

The following preferred embodiments of the invention, together with the following examples, explain the principles of the invention.

C-Mix (as described in Wyant et al U.S. Pat. No. 3,499,491) is an excellent formulation for cementing oil or gas wells. The ingredients of C-Mix comprise Portland cement, fly ash, soda ash, and pozzolan, and an accelerator such as sodimn silicate. Slurries of C-Mix achieve high compressive strength on hardening, provide excellent theology, and have zero-free water, low fluid loss, acceptable thickening times, and very low permeability. However, a problem with C-Mix is its thermal stability at high temperatures. C-Mix slurries, which contain Portland cement and non-hydraulic mud materials such as bentonite and low-gravity solids, show strength retrogression at temperatures above 230°–250° F. (see Table 1).

TABLE 1

EFFECT OF TEMPERATURE AND C-MIX CONCENTRATION ON COMPRESSIVE STRENGTH OF C-MIX PREPARED WITH 12 LB/GAL SEAWATER LIGNOSULFONATE MUD

| C-Mix Concentration | 200 lb/bbl | | 250 lb/bbl | | 300 lb/bbl | |
|---|---|---|---|---|---|---|
| Device Used Test Temperature | UCA* | API | UCA | API | UCA | API |
| | Compressive Strength (psi) | | | | | |
| 140° F. | 1420 | — | 1880 | 2930 | — | — |
| 180° F. | 1150 | 1500 | 1640 | 2370 | — | — |
| 220° F. | 1040 | 1280 | 1480 | 2880 | 1920 | 2830 |
| 260° F. | 690 | — | 360 | 260 | 710 | 510 |
| 300° F. | 110 | 150 | 280 | 310 | 490 | 430 |

*UCA - Ultrasonic Cement Analyzer by Halliburton

Strength retrogression is primarily due to the breakdown of hydration products of Portland cement. Retrogression is amplified by the higher water content of C-Mix slurries in the presence of non-hydraulic materials in the mud. In accordance with the present invention it has been discovered that admixing C-Mix with a drilling mud and either a particulate glass (e.g., ground or powdered glass) or slag (e.g., blast furnace slag or microfine slag) produces a new cementing medium (HTC-Mix or S-Mix) which at temperatures up to and exceeding 450° F. is resistant to thermal strength retrogression, and which has major benefits including low slurry density, thixotropic nature, reduction of mud disposal volumes, simple operation, low cost, good rheology, zero-free water, low fluid loss, low permeability, high tolerance to contamination, and high compressive strengths.

An improved mud conversion process has been invented by adding blast furnace or particulate glass slag and one or more activating agents to drilling mud. This S-Mix process is simpler and more economical than the C-Mix or HTC-Mix cementing operations. Cementing with S-Mix does not require dry blending of materials if a composition with 100% slag is, utilized. S-Mix jobs can be run using rig equipment without using cement pumping units. Bulk or sacked slag or glass can be added to the mud through the rig mud material mixing units. Dry or liquid chemical activators can be metered into the stream of mud. Bulk cement service and pumping charges can be reduced or eliminated since cementing operations are handled with the rig equipment if S-Mix is mixed with 100% slag.

In general, both batch mixing and continuous mixing are suitable for large volume HTC-Mix or S-Mix operations.

The present invention is most useful with the following water-base drilling muds: spud muds, seawater muds, salt water muds, brine muds, lime muds, gypsum muds, lignosulfonate muds, polymer (such as PHPA—partially hydrolyzed polyacrylamide) muds, KCl inhibited muds, emulsion (oil in water) muds, surfactant muds, etc. This invention is expected to be applicable in all water-based fluids. Some hydrocarbons such as diesel, mineral oil or crude oil, or polyalcohol-type fluids can be tolerated in this invention.

C-Mix broadly comprises 20 to 60 wt % Portland cement, 10 to 50 wt % fly ash, 0 to 15 wt % soda ash, 0 to 50 wt % natural pozzolan, and 5 to 30 wt % sodium silicate.

HTC-Mix is prepared by adding either or a combination of 10 to 60 wt % blast furnace slag or 10 to 60 wt % powdered glass to the above C-Mix composition.

A preferred activator for HTC-Mix is sodium silicate; other suitable activators include fluorides such as sodium fluoride, sodium silicofluoride, magnesium silicofluroide, zinc silicofluoride, and alkaline material such as sodium carbonate, potassium carbonate, sodium hydroxide, potassium hydroxide, and calcium hydroxide. The cement may be either a construction-grade cement or any API specified Portland cement.

S-Mix can be prepared by adding 100 wt % blast furnace slag to a water-base mud and one or more alkaline or other activating agents such as sodium sulfate. For example, although a S-Mix composition may have 75% slag, 25% Portland cement, and small amounts of activators, the composition with 100% slag is preferred over the former. Suitable activators for S-Mix include sodium hydroxide, potassium hydroxide, sodium carbonate, potassium carbonate, sodium sulfate, sodium silicates, and other alkaline materials.

Both HTC-Mix and S-Mix slurries are prepared by adding a dispetsant (thinner and retarder) and HTC-Mix or S-Mix materials in a water-base drilling fluid. Of course, amounts of HTC-Mix or S-Mix determine slurry density, compressive strength and yield (volume increase). The specific dispersant(s) needed and the amount(s) required should then be determined. Rheological properties and cement slurry properties such as thickening time, free water, fluid loss, settling, etc. may also be determined by the dispersant(s).

The strength development of HTC-Mix or S-Mix slurries is heavily influenced by their concentrations in the mud and by the thinner or dispersants used. The type of thinner and its concentration are major variables that influence strength development. Thinners are also employed to control viscosity, thickening time, and setting time of the HTC-Mix or S-Mix. Three commercial thinners have been found to be especially beneficial for the HTC-Mix or S-Mix: 1) chrome-free sugar-containing lignosulfonates; 2) chrome-free de-sugared lignosulfonate; and 3) chrome-free sulfometholated tree bark extract (a modified humic acid). About two to eight lb/bbl of such thinners is usually acceptable, although 15 to 20 lb/bbl can be used. Chrome-free sugar-containing lignosulfonate is a powerful retarder for both HTC-Mix and S-Mix. The retarding effect of chrome-free de-sugared lignoslfonate is moderate; chrome-free sulfometholated tree bark extract may be used alone or added to chrome-free de-sugared lignosulfonate to produce a more efficient retarder and at the same time control theology of the HTC-Mix or S-Mix slurry.

For example, lignosulfonate dispersants may not be desirable for non-dispersed polymer muds since the lignosulfonates have a tendency to promote dispersion of drill cuttings. Polymeric dispersants such as "CYPAN" (high molecular weight sodium polyacrylate by American Cyanamid), "NEWTKIN" (low molecular sodium polyacrylate from Milpark), and "MILTEMP" (sulfonated styrene maleic anhydride from Milpark) are very effective in thinning and retarding the HTC-Mix or S-Mix slurties. Where formation conditions dictate, a non-dispersed system can easily be converted to a dispersed system to tolerate a higher degree of drilled solids. This can be done by adding lignosulfonate dispersants to the system.

HTC-Mix or S-Mix formulated with slag, e.g., blast furnace slag (tradename "NEWCEM" by Atlantic Cement Company and Colton slag from California Portland Cement Company), or particulate glass, e.g., ground or powdered glass, can set up at low temperatures (e.g., 40° F.) and yet resist strength retrogression at temperatures of up to approximately 600° F. and higher, depending upon the specific formulation of the HTC-Mix and S-Mix and other conditions.

This invention utilizes blast furnace slag which is a by-product of the iron ore refining process. Only quenched slag known as granulated, pelletized or rapid air blown slag has high hydraulic properties and is useful for this invention. Chemical activation of slag is entirely different from Portland cement. With Portland cement, upon addition of water, hydration of the cement begins. Slag will not react in water at moderate temperatures but when chemically activated, hydration of slag will continue to set hard.

The term blast furnace slag refers to the refuse from the melting of metals or reduction of ores in a furnace. Most notably, blast furnace slag is a by product of the manufacture of steel in a blast furnace. In steel making, the blast furnace slag is discharged from the furnace as a molten stream at a temperature typically between 1400° C. and 1600° C. Rapid quenching of this slag results in its conversion into a material which has hydraulic properties. The rapid quenching of the slag converts it into a glassy state and it is generally recognized that the hydraulic quality of the slag depends upon the effectiveness of the process used to rapidly cool the slag and freeze it into the granulated, glassy state.

Silicon dioxides, aluminum oxides, iron oxides, calcium oxide, magnesium oxide, sodium oxide, potassium oxide, and sulfur are some of the chemical components in slags. The actual presence and/or amounts of these components varies since the optimum furnace operations may vary with the metals or ores being processed. Hence, there is seldom any significant flexibility to adjust the chemical composition of the slag to improve hydraulicity.

However, since the quenching process directly influences the hydraulicity, determination of hydraulic properties through chemical analysis has limited value. Two slags having the same general chemical composition can have significantly different hydraulicity due to the quenching process and its effectiveness. The glass content of slags increases with the rate of cooling and water cooling typically produces a very high cooling rate. Air cooling often produces slags with various levels of glass content due to differences in cooling rates. Smaller particles have a higher glass content due to faster cooling while the larger particles cool more slowly and have a lower glass content. Therefore, the selection of a cementitious blast furnace slag for this invention is best determined by a direct performance (strength) test of the slag mixed with water to evaluate the slag's hydraulicity.

The preferred blast furnace slag of the invention is a high glass content slag produced by quickly quenching the molten slag through intimate contact with large volumes of cool water. Slags produced by air quenching may be used in the invention provided they are determined to have cementitious properties. However, they are less desirable. The fineness of the slag should be between about 2000 $cm^2/g$ and 15,000 $cm^2/g$ and more preferably between 3000 $cm^2/g$ and 9000 $cm^2/g$ and most preferably between 4000 and 6500 $cm^2/g$. A commercially available blast furnace slag which fulfills the requirements of the new invention is marketed under the trade name "NEWCEM" by the Blue Circle Atlantic Company. This slag is obtained from the Bethlehem Steel Corporation blast furnace at Sparrows Point, Md.

Conventional slag cements (mixtures of slag and Portland cement in water) have many useful properties directly or indirectly related with this invention. Slag cements resist degradation by acidic gases such as $CO_2$ and $H_2S$, acids, sulfate water, and have demonstrated higher compressive strength than Portland cement. Slag cements produce a slurry that is lighter than Portland cements since its density is lower than Portland cement (specific gravity 2.90 vs. 3.14). Most importantly, properly formulated slag cements are thermally stable to 1500° F. and have a lower heat of hydration. The slag cements harden below its freezing point. In general, a small increase in temperature can cause a substantial increase of compressive strength.

Microfine slag, an alternative to blast furnace slag, is slag dust collected by an electroprecipitator or ultrafine ground. The activator in the HTC Mix, e.g., sodium silicate, also acts as an activator for the slag.

The alternative to the use of slag is particulate glass, e.g., ground glass (ground to pass 325 mesh) or powdered glass. Glass is an amorphous, super cooled liquid material comprising silica, soda ash, and lime, that is practically inert to all chemicals. It is theorized, although the present invention is not limited to this theory, that the high surface area of ground glass can be a source of reactive sodium silicate at elevated temperatures, and especially in a high pH environment.

LABORATORY TESTING OF HTC-MIX

HTC-Mix Formulations

Table 2 lists several preferred TC-Mix formulations and their compressive strengths measured after aging at 400° F. for two weeks. High temperature aging tests were conducted at 400° F. in order to accelerate the process for thermal strength retrogression in the test specimens in a short period of time. Compressive strength measurements of specimens first cured at 140° F., for three days, and then aged at 400° F., were used for evaluation. A major screening criterion was that a high temperature HTC-Mix formulation should have a minimum compressive strength of 800 psi after aging at 400° F. for two weeks and otherwise have good theological properties and normal setting behavior at 140° F.

As shown in Table 2, C-56, C-57 and other formulations met the selection criteria. Both C-56 and C-57 had compressive strengths greater than 800 psi after aging at 400° F. for two weeks. C-56 utilized ground glass, while C-57 used "NEWCEM" (commercial granulated blast furnace slag from Blue Circle Cement Company). C-57 formulation was designated as HTC-Mix and more testing was conducted.

The C-57 (HTC-Mix) slurries were cured at 140° F. and cores were tested for Brinell hardness and crushed for compressive strength. The results are given in Table 3. There were no problems with slurry theologies even at higher concentrations. Strength development is also excellent at this temperature.

C-57 is the preferred formulation for the HTC-Mix composition. Both C-56 and C-62 formulations would be more expensive than C-57 due to higher material costs of ground glass and SC-100. The powdered glass is not commercially available at this time. MC-100 is a slag which is specially ground to ultra fine particle sizes.

TABLE 2

COMPRESSIVE STRENGTHS OF HTC-MIX FORMULATIONS AT 300 LB/BBL IN 9.5 LB/GAL LAB DIATOMITE MUD AFTER HEAT AGING AT 400° F. FOR TWO WEEKS

| Formulation Component | C-56B | C-57C | C-60 | C-61 | C-62 |
|---|---|---|---|---|---|
| | Composition (wt %) | | | | |
| Class A Cement | 59 | 33 | 33 | 50 | 33 |
| "SS-C200" | 14 | 17 | 17 | 14 | 17 |
| *"DIAMIX A" (natural pozzolan) | — | 14 | 14 | — | 14 |
| Flyash, Type F | — | — | — | — | — |
| Ground Glass | 24 | — | 33 | 33 | — |
| "NEWCEM" | — | 33 | — | — | — |
| "MC-100" | — | — | — | — | 33 |
| $Na_2CO_3$ | 3 | 3 | 3 | 3 | 3 |
| Compressive Strength (psi) | 850 | 1020 | 405 | 880 | 1000 |

| Formulation Component | C-63 (C-57 equivalent) | C-64 | C-65 | C-66 | C-68 (C-57 equivalent) |
|---|---|---|---|---|---|
| | Composition (wt %) | | | | |
| Class A Cement | 33 | 33 | 32 | 33 | 33 |
| "SS-C200" | 16 | 17 | 17 | 17 | 17 |
| *"DIAMIX A" (natural pozzolan) | 14 | 14 | — | — | — |
| Flyash, Type F | — | — | — | 14 | — |
| Ground Glass | — | — | — | — | — |
| "NEWCEM" | 17 | 23 | 48 | 33 | 47 |
| "MC-100" | 17 | 10 | — | — | — |
| $Na_2CO_3$ | 3 | 3 | 3 | 3 | 3 |
| Compressive Strength (psi) | 910 | 810 | 625 | 930 | 700 |

*"DIAMIX A" is Type N mined pozzolan by BJ Corporation.

TABLE 3

COMPRESSIVE STRENGTHS OF C-57 SAMPLES CURED AT 140° F. AT VARYING CONCENTRATIONS

| C-57 Concentration (lb/bbl) | Compressive Strength (psi) | | |
|---|---|---|---|
| | UCA* | UCA Core Crushed | Brinell Hardness |
| 350 | 2369 | 3060 | 3341 |
| 300 | 1874 | 1365** | 2664 |
| 230 | 1593 | 1660 | 2209 |
| 200 | 1073 | 1690 | 1671 |

Notes: Lab diatomite mud treated with 8 lb/bbl Spersene.
*Ultrasonic Cement Analyzer by Halliburton.
**Sample was defective.

Table 3 demonstrates the effect of C-57 concentration on compressive strength. A 9.5 lb/gal lab Diatomite mud treated with 8 lb/bbl "SPERCENE CF" was used for the mud conversion. The higher the C-57 concentration, the stronger the cement becomes. In general, API compressive strengths or equivalent crushed compressive strength values of an HTC-Mix or S-Mix are about 1.5 times higher than the corresponding UCA compressive strengths.

A series of long-term exposure tests were conducted on C-57 slurries at 300 lb/bbl in a laboratory prepared Diatomite mud treated with 8 lb/bbl "SPERCENE CF" (MI Drilling Fluids lignosulfonate mud thinner). The HTC-Mix slurries were poured into two 2-inch cubic brass molds and cured in a high temperature curing chamber which was programmed to maintain 140° F. for three days and then ramped up to and held at 400° F. for a specified period of time. All high temperature strength data represent an average of two cubes. As shown in Table 4, the aging time was varied from half day to six months. Obviously, one half day is not enough to cause complete strength retrogression at 400° F. However, the compressive strength of C-57 was fairly constant up to six months after initial strength reduction shown in two-week tests.

TABLE 4

LONG-TERM COMPRESSIVE STRENGTH MONITORING OF 300 LB/BBL C-57 AT 400° F.

| Exposure Time | Compressive Strength (psi) | Number of Samples |
|---|---|---|
| 0.5 day | 1890 | 2 |
| 2 weeks | 960 | 14 |
| 1 month | 950 | 4 |
| 2 months | 970 | 2 |
| 3 months | 810 | 2 |
| 6 months | 830 | 2 |

An effort was made to determine an exact amount of chrome-free lignosulfonate thinner needed for an acceptable thickening time of five to eight hours at a BHCT (bottom hole circulation temperature) of 107° F. The effect of chrome-free lignosulfonate thinner concentration on thickening time of an HTC-Mix slurry prepared with 200 lb/bbl C-57 in a 9.5 lb/gal lab Diatomite mud was measured. The C-57 was dry blended using a standard C-57 formulation comprising 33% Riverside Class G cement, 17% "SS-C200" (sodium silicate made by PQ Corporation), 14% Bakersfield "POZMIX A" (flyash supplied by Halliburton), 3% soda ash, and 33% "NEWCEM" (blast furnace slag made by Blue Circle Cement Company). Thickening times were measured on an Autoclave Consistometer at a BHCT of 107° F. (heating rate 1.83° F./min) and at 2,000 psi. Table 5 lists "SPERCENE CF" concentrations and resulting thickening times of this HTC-Mix slurry.

TABLE 5

THICKENING TIME vs. "SPERCENE CF"* CONCENTRATION:
200 LB/BBL C-57 IN 9.5 LB/GAL DIATOMITE MUD

| "SPERCENE CF"* Concentration (lb/bbl) | Thickening Time at 107° F. (Hr:Min) |
|---|---|
| 2.00 | 2:08 |
| 2.10 | 2:46 |
| 2.15 | 2:50 |
| 2.20 | 7:32 |
| 2.25 | 14:37 |
| 2.50 | 17:36 |
| 3.00 | 16:44 |
| 3.00 + 20 lb/bbl Gel | 1:42 |
| 5.00 + 20 lb/bbl Gel | 18:45 |

*Chrome-free lignosulfonate made by MI Drilling Fluids.

Table 5 indicates that "SPERCENE CF" is a powerful retarder for this HTC-Mix slurry and the thickening time is very sensitive to the concentration of "SPERSENE CF". An optimum concentration is 2.2 lb/bbl under this test condition. In order to check the sensitivity of "SPERCENE CF" concentration on thickening time, 20 lb/bbl bentonite was added to an HTC-Mix slurry containing 3 lb/bbl "SPERCENE CF". The thickening time was reduced from 16:44 to 1:42 due to the addition of gel. An addition of an extra amount of 2 lb/bbl "SPERCENE CF" to this slurry has brought the thickening time back to the original level.

In Table 6, the effect of "UNICAL CF" on the compressive strength development of C-57 slurry consisting of 9.1 lb/gal Diatomite field mud treated with 200 lb/bbl C-57 is shown. The higher the "UNICAL CF" concentration, the stronger the HTC-Mix becomes. There is no appreciable difference in rheology; there are dramatic differences in set strengths. UCA and API compressive strengths increase proportionally with the concentration of "UNICAL CF".

TABLE 6

EFFECT OF "UNICAL CF"** ON RHEOLOGY
AND COMPRESSIVE STRENGTH
OF 200 LB/BBL C-57 IN 9.1 LB/GAL DIATOMITE MUD

| "UNICAL CF" Concentration (lb/bbl) | Rheology (PV/YP) | UCA Compressive Strength (psi) | UCA Core Crushed Strength (psi) | UCA Set Time @ 500 psi (hr:min) |
|---|---|---|---|---|
| 2.2 | 12/15 | 447 | 630 | 5:36* |
| 6.0 | 20/2 | 644 | 1,060 | 9:00 |
| 8.0 | 13/6 | 733 | 1,400 | 8:29 |
| 10.0 | 14/4 | 888 | 1,540 | 9:32 |
| 12.0 | 13/3 | 984 | 2,070 | 8:34 |

Notes:
PV - plastic viscosity, cp
YP - yield point, lb/100 ft$^2$
Mud - 9.05 lb/gal field mud from well 523-29 treated with 10.8 lb/bbl sodium chloride.
*Time to reach at 447 psi.
**"UNICAL CF" is chrome-free lignosulfonate made by Milpark.

HTC-Mix Yield and Density Calculations

A "yield" value in cubic feet/sack of a slurry to be mixed must be entered to operate an automatic density control unit installed on some cement mixing units. As in any other cement calculations, a specific gravity and a bulk density are needed to calculate a yield value of HTC-Mix. Therefore, specific gravities and bulk densities of individual ingredients along with the C-57 HTC-Mix formulation are given in Table 7.

TABLE 7

C-57 FORMULATION AND SPECIFIC GRAVITY AND
BULK DENSITY VALUES

| C-57 Component | Percent | Sp.G. | Bulk Density, lb/ft$^3$ |
|---|---|---|---|
| Class G Cement | 33 | 3.14 | 94 |
| "SSC-200" | 17 | 2.478 | 74 |
| "POZMIX A" | 14 | 2.468 | 74 |
| Soda Ash | 3 | 2.533 | 76 (?) |
| Slag | 33 | 2.90 | 86.5 |
| Composite Value | 100 | 2.84 | 84.79 |

The calculated bulk density of the C-57 formulation is approximately 85 pounds/cubic foot which was verified to be reasonable in the laboratory. The calculated specific gravity is 2.84 which was experimentally confirmed to be accurate.

Cementing of Diatomite Wells, 567-GR-29 and 523-29

A water flood injector well, 567-GR-29, and a producer well, 523-29 were cemented with HTC-Mix. These wells are located in the South Belridge Field, Calif.

An 11.5 lb/gal HTC-Mix was pumped as the lead slurry which was designed to fill the 7-inch annulus from 200 feet from the TD for (3,000 feet) both Diatomite wells. The HTC-Mix, tail, and cap cements were dry blended at the service company bulk plant.

The HTC-Mix was mixed at 200 lb/bbl in a 9.05 lb/gal mud and pumped using the same equipment as a standard job with the exception of using drilling mud instead of water to mix cement. A "slotted pump shoe" was placed in the suction compartment of the mud pit to filter out drill cuttings which might otherwise plug up the cementing equipment. A portable centrifugal pump was used to pump the mud from the mud pit to the RCM cement mixing unit. All slurries were mixed and pumped "on the fly" using the RCM cement unit which was manually operated.

A 15.6 lb/gal tail slurry consisting of Class H, 35% "SSA-I" (silica flour supplied by Halliburton) and 3% CaCl$_2$ was pumped to fill the bottom 200 feet. A small volume of 15.6 lb/gal cap slurry consisting of Class H cement, 35% SSA-1, 3% CaCl$_2$, and a 10-pound sack of "CAL-SEAL" (calcium sulfate hemaydrate supplied by Halliburton) were also pumped down in the annulus at the completion of pumping the lead and tail cements. The cement designs were the same for both wells. Both cement jobs were placed successfully. An evaluation of these wells by cement bond logs, "CBT" (Cement Bond Tool by Schlumberger) and "CET" (Cement Evaluation Tool by Schlumberger) was very good.

Cementing of Geophone Wells

Three special geophone wells were drilled and completed in the South Belridge field. A geophone assembly is 2.2 inches OD, 11 inches long, and connected to 150 pairs of twisted wire in ½-inch OD cable. An array of 50 geophones spaced every 5 feet for high-resolution tomography over a 250-feet interval was strapped on a 2⅞-inch tubing. The tubing strapped with the geophone assemblies was used to place the geophones at a proper location in the wellbore and to pump cement through the tubing.

It was extremely critical for the success of the project to properly cement these geophone assemblies. In order to provide maximum acoustic transmission, a good bond as well as absence of any mud or air pockets in the wellbore were necessary. A low viscosity slurry was needed in order to completely fill all gaps and to cover irregularly shaped geophones.

For the purpose of logging these wells, a non-dispersed "NEWDRILL" (Milpark's partially hydrolyzed polyacrylamide polymer) mud was treated with sodium chloride to maintain a filtrate salinity from 18,000 to 20,000 ppm chloride for the first geophone well. Potassium chloride was used for the second and third geophone wells. The mud was treated with a higher level of lignosulfonate thinner in order to reduce the slurry viscosity and to provide higher compressive strengths. The type of salt used in the mud system and concentration of lignosulfonate thinner are as follows:

| Geophone Well ID | Type of Salt Used in Mud | Lignosulfonate Thinner Concentration (lb/bbl |
|---|---|---|
| #1 | NaCl | 6.0 |
| #2 | KCl | 6.0 |
| #3 | KCl | 4.0 |

HTC-Mix was dry blended. For each well, a total of 45,757 pounds of final blend containing 44,400 pounds of C-57 and 1,333 pounds of lignosulfonate (6 lb/bbl in mud) was prepared. The HTC-Mix was mixed with 9.05 lb/gal mud at a ratio of 200 pounds C-57 per barrel of mud. A total of 267 barrels HTC-Mix was pumped by mixing the dry blend into 222 barrels of the mud.

The HTC-Mix slurry was pumped at approximately 4 bpm (barrel per minute). A 25-sacks tail slurry was pumped to cover the casing shoe. This cementing procedure was used for all three geophone wells.

Mud densities for all three geophone wells were 9.05 lb/gal. The sample densities seem to be more uniform and slightly higher than the densometer readings.

All three HTC-Mix slurries were very thin. All the Fann 35 Viscometer 6 rpm and 3 rpm readings were zero. Plastic viscosities were low and yield point values were close to zero or less than zero. Although the 3-second gels were close to zero, 10-minute gels were much higher than the 3-second gels.

The success of cementing operations and the quality of cement jobs were evaluated by microseismic minifracture experiments. Signals from discrete microseismic events were excellent in all three observation wells.

S-Mix

S-Mix, which is formulated with blast furnace slag and common alkaline activators, is simpler and more economical than either C-Mix or HTC-Mix since it does not require expensive sodium silicate. S-Mix formulations were field tested in two Diatomite wells, 514L-29 and 568E-33, in the Belridge Field, Calif., and in a North Hobbs Unit well, 27-221W, in Hobbs, N. Mex. All cementing operations were successfully carried out.

A series of UCA strength development experiments was carried out by adding 225 lb/bbl Colton ground slag to a 9.8 lb/gal polymer mud (0.94 bbl water, 12 lb/bbl bentonire, 0.1 gal/bbl partially hydrolyzed polyacrylamide, 0.25 lb/bbl carboxymethylcellulose, 60 lb/bbl slag, 35 lb/bbl "REV-DUST", simulated drill solids by Milwhite) and by treating the resulting slurry with varying amounts of activators and thinnets. A representative S-Mix formulation (225 lb/bbl slag, 9 lb/bbl NaOH, 3 lb/bbl $Na_2CO_3$, and 4 lb/bbl "MILTELP", sulfonated styrene maleic anhydride copolymer from Milpark) was used for a full-scale displacement test. This S-Mix formulation had the following properties:

| | |
|---|---|
| Plastic Viscosity, cp | 19 |
| Yield Point, lb/100 ft² | 34 |
| 10-sec Gel Strength, lb/100 ft² | 16 |
| 10-min Gel Strength, lb/100 ft² | 32 |
| Thickening Time at 120° F., hr:min | 4:42 |
| API Fluid Loss, 80° F./100 psi, ml | 31.4 |
| Cement Fluid Loss, 120° F./1000 psi, ml | 106 |
| API Free Water, ml | 0 |
| API Compressive Strength, psi (Aged at 140° F./7 days, average of 6 samples) | 1,531 |
| Shear Bond, psi (Aged at 140° F./7 days, average of 4 samples) | 59 |

A 9.3 lb/gal PetroDrill (PHPA, partially hydrolyzed polyacrylamide, shale-controlling agent from UniBar) mud was converted into an 11.8 lb/gal S-Mix slurry by adding 165 lb/bbl Colton ground slag and 2 lb/bbl Miltemp (SSMA) as a thinner and retarder.

For each Diatomite well, a total of 17,900 lb of S-Mix was dry blended at the service company yard. The formulation for the S-Mix and actual weights for each ingredient are as follows:

| | | |
|---|---|---|
| Colton Slag | 165 lb/bbl | 16,500 lb |
| Caustic Soda Bead | 9 lb/bbl | 900 lb |
| Soda Ash | 3 lb/bbl | 300 lb |
| *SSMA | 2 lb/bbl | 200 lb |

*sulfonated styrene maleic-anhydride copolymer by Milchem)

This formulation gives a yield of 3.248 cu ft/sack which is equivalent to a volume increase of 16.2 percent. Both S-Mix cementing jobs went well operationally. Both wells had full cement returns. Prior to the field test of the North Hobbs Unit well, six S-Mix formulations were tested using a 10.45 lb/gal salt saturated mud on UCAs and these test results are tabulated in Table 8. The compressive strengths are reasonable despite the salt-saturated muds and low test temperatures. The UCA compressive strength plots indicate that SS-35 and SS-36 had the shortest set times (4 hr:15 min and 9:03, respectively), while SS-31 and SS-34 had the highest UCA compressive strengths (1,259 psi and 1,187 psi, respectively).

TABLE 8

EFFECT OF ACTIVATORS ON UCA SET TIME AND COMPRESSIVE STRENGTH OF S-MIX IN A 10.45 LB/GAL SALT-SATURATED FIELD MUD

| Sample Number | Additive (lb/bbl) | | | Test Temp. (°F.) | UCA* Set Time (Hr/Min) | UCA Compressive Strength (psi) | Crushed Compressive Strength (psi) |
|---|---|---|---|---|---|---|---|
| | NaOH (lb/bbl) | $Na_2CO_3$ (lb/bbl) | Desco CF | | | | |
| SS-31 | 10 | 14 | — | 68 | 21:33 | 1,250 @16 days | 1,450 |
| SS-32 | 10 | 12 | — | 68 | 16.32 | 1,086 @16 days | 1,550 |
| SS-33 | 10 | 10 | — | 68 | 15:28 | 1,094 @16 days | 1,360 |
| SS-34 | 10 | 8 | — | 66 | 18:20 | 1,187 @16 days | 1,630 |
| SS-35 | 10 | 8 | 0.25 | 90 | 9:03 | 403 @1 day | — |
| SS-36 | 10 | 10 | 0.25 | 90 | 4:15 | 338 @1 day | — |

Notes:
*UCA set time to reach a compressive strength of 50 psi, hr:min.
All formulations contain 225 lb/bbl Colton ground slag.

| Rheology of | SS-35 | SS-36 |
|---|---|---|
| Plastic Viscosity, cp | 21 | 22 |
| Yield Point, lb/100 ft² | 13 | 3 |
| Gel Strengths, lb/100 ft² | 8/58 | 2/8 |

The SS-36 formulation was chosen because of its faster UCA set time and good rheological properties. Two-hundred-sixty-five barrels of 10.45 lb/gal salt-saturated mud were converted to 320 bbl of 13.06 lb/gal S-Mix by adding a dry blend of 225 lb/bbl Colton ground slag, 10lb/bbl soda ash, 10 lb/bbl caustic soda beads, and 0.25 lb/bbl "DESCO CF" (a chrome-free free polyphenolic tannin mud thinner, available from Drilling Specialties Co.). It was dry blended in three approximately equal batches at the Service camp and transported to the well site. The blend was mixed with the field mud, 10.45 lb/gal salt-saturated, and pumped at a rate of 10 barrels per minute using an RCM cement unit. The 5½-inch long string (4,395 feet TVD) was cemented in this way with this 13 lb/gal S-Mix lead and a 15 lb/gal conventional tail cement. (This well is a 26° directional well.) All aspects of the cementing operation went well except that the cement mixing operator had some difficulty maintaining a slurry density of 13 lb/gal.

While the slurry compositions methods of use of the invention have been described, many other variations will occur to those skilled in the art. It is intended that all such variations which fall with the scope of the appended claims be embraced thereby.

What is claimed:

1. A method for cementing a directional well comprising:

dry blending particulate blast furnace slag with soda ash and caustic soda beads;

mixing the dry blended mixture with mud used to drill the well;

pumping the slag/mud mixture via casing into the well, the slag/mud mixture being compatible with mud left in the well, thereby reducing the tendency of inclined portions of the casing from resting on the borehole wall.

2. The method of claim 1 including following the slag/mud cement with a conventional tail cement which is heavier than the slag/mud cement.

3. The method of claim 1 including adding a chrome-free polyphenolic tannin mud thinner to the slag/mud mixture.

* * * * *